United States Patent
Axén et al.

(10) Patent No.: US 10,034,213 B2
(45) Date of Patent: Jul. 24, 2018

(54) METHOD AND NETWORK ENTITY FOR LOAD CONTRIBUTION DISTRIBUTION IN A WIRELESS COMMUNICATION SYSTEM

(71) Applicant: Telefonaktiebolaget LM Ericsson (publ), Stockholm (SE)

(72) Inventors: Rasmus Axén, Linköping (SE); Fredrik Gunnarsson, Linköping (SE); Stefan Johansson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 136 days.

(21) Appl. No.: 15/027,598

(22) PCT Filed: Oct. 18, 2013

(86) PCT No.: PCT/SE2013/051220
§ 371 (c)(1),
(2) Date: Apr. 6, 2016

(87) PCT Pub. No.: WO2015/057120
PCT Pub. Date: Apr. 23, 2015

(65) Prior Publication Data
US 2016/0249264 A1    Aug. 25, 2016

(51) Int. Cl.
*H04J 3/24*    (2006.01)
*H04W 36/22*    (2009.01)
(Continued)

(52) U.S. Cl.
CPC ............ *H04W 36/22* (2013.01); *H04L 5/001* (2013.01); *H04L 5/0076* (2013.01);
(Continued)

(58) Field of Classification Search
None
See application file for complete search history.

(56) References Cited

U.S. PATENT DOCUMENTS

2012/0082100 A1*  4/2012  Ahmadi ............ H04W 72/1215
                                                   370/329
2014/0155080 A1*  6/2014  Austin ................ H04W 28/08
                                                   455/453
(Continued)

FOREIGN PATENT DOCUMENTS

WO  PCT/EP2011/070708    * 11/2011
WO  WO 2013/075738    5/2013
WO  WO 2013/116988    8/2013

OTHER PUBLICATIONS

Supplementary European Search Report for Application No. / U.S. Pat. No. 13895468.0-1851 / 3058771 PCT/SE2013051220—Oct. 4, 2016.

(Continued)

*Primary Examiner* — Kwang B Yao
*Assistant Examiner* — Juvena Loo
(74) *Attorney, Agent, or Firm* — Baker Botts, LLP

(57) ABSTRACT

The present disclosure presents a method and a network entity for load contribution distribution in a wireless communication system supporting component carrier communication. The network entity serves a first cell of a wireless communication system. The method comprises receiving (61) information on one or more secondary cell usages of the first cell, wherein a secondary cell usage represents a secondary component carrier load of a wireless device connected to a primary cell of one or more further cells which are different from the first cell. The information on primary cell usage and the one or more secondary cell usage for the first cell is compiled (62) in the network entity. The method further comprises identifying (63) the respective primary cell for each secondary cell usage. Finally it comprises sending (64) secondary cell usage information to a respective network entity serving the identified respective primary cell for each secondary cell usage.

21 Claims, 4 Drawing Sheets

(51) Int. Cl.
- *H04W 28/08* (2009.01)
- *H04L 5/00* (2006.01)
- *H04L 12/851* (2013.01)
- *H04W 36/00* (2009.01)
- *H04W 36/04* (2009.01)
- *H04W 72/04* (2009.01)

(52) U.S. Cl.
CPC ........... *H04L 5/0094* (2013.01); *H04L 47/24* (2013.01); *H04W 28/08* (2013.01); *H04W 36/0061* (2013.01); *H04W 36/04* (2013.01); *H04L 5/0044* (2013.01); *H04W 72/0486* (2013.01)

(56) References Cited

U.S. PATENT DOCUMENTS

| | | | | |
|---|---|---|---|---|
| 2014/0226605 A1* | 8/2014 | Xu | ........................ | H04W 24/02 370/329 |
| 2014/0226609 A1* | 8/2014 | Hooli | .................... | H04W 16/14 370/329 |
| 2014/0308953 A1* | 10/2014 | Park | .................... | H04W 36/165 455/436 |

OTHER PUBLICATIONS

3GPP TS 36.331 V10.11.0; Technical Specification; 3rd Generation Partnership Project; Technical Specification Group Radio Access Network; Evolved Universal Terrestrial Radio Access (E-UTRA); Radio Resource Control (RRC); Protocol specification (Release 10)—Sep. 2013.

3GPP TSG-RAN WG3 Meeting #75; Dresden, Germany; Source: Nokia Siemens Networks; Title: Carrier Based ICIC for Inter-Site CA Optimization (R3-120283)—Feb. 6-10, 2011.

PCT International Search Report for International application No. PCT/SE2013/051220—Aug. 26, 2014.

PCT Written Opinion of the International Searching Authority for International application No. PCT/SE2013/051220—Aug. 25, 2014.

* cited by examiner

METHOD AND NETWORK ENTITY FOR LOAD CONTRIBUTION DISTRIBUTION IN A WIRELESS COMMUNICATION SYSTEM

PRIORITY

This nonprovisional application is a U.S. National Stage Filing under 35 U.S.C. § 371 of International Patent Application Serial No. PCT/SE2013/051220, filed Oct. 18, 2013, and entitled "Method And Network Entity For Load Contribution Distribution In A Wireless Communication System".

TECHNICAL FIELD

The present disclosure relates in general to methods and network entities for load contribution distribution in a wireless communication system and more specifically to methods and network nodes for load contribution distribution in a wireless communication system supporting primary and secondary component carrier communication.

BACKGROUND

3GPP is responsible for the development and maintenance of GSM/GPRS, WCDMA/HSPA and LTE standards. This disclosure focuses primarily on LTE, based on Orthogonal Frequency-Division Multiplexing (OFDM) and Single-Carrier Frequency-Division Multiple Access (SC-FDMA), which is also known as the Long Term Evolution of UTRAN, or Evolved Universal Terrestrial Radio Access Network (E-UTRAN). Detailed UTRAN radio access specifications are described in the 25-series of 3GPP specifications, while E-UTRAN specifications are found in the 36-series. LTE was introduced in 3GPP Release 8, but the development and future evolution of LTE continues in 3GPP Releases 9, 10 and so on.

A radio base station provides communication services in one or more areas, or cells. A cell is further associated to a carrier frequency and a radio access technology, such as GSM/GPRS, WCDMA/HSPA, LTE as well as similar and future access technologies. Mobile stations in the cell, served by the radio base station, receive from (downlink, forward link) and/or transmit to (uplink, reverse link) the radio base station at a carrier frequency. In time division duplex, TDD, the same carrier frequency is used for both uplink and downlink, while in frequency division duplex, different carriers frequencies are used, typically at a specific duplex frequency separation. In the sequel, the main description concerns, without loss of generality, downlink communication and the same can be applied for uplink as well, and either FDD or TDD or combinations can be considered.

Carrier aggregation is used in LTE, i.e. LTE-Advanced, in order to increase the bandwidth, and thereby increase the bitrates. Carrier aggregation implies that a terminal receives or transmits on multiple component carriers. In the case of carrier aggregation, multiple LTE carriers, each with a bandwidth up to 20 MHz, can be transmitted in parallel to/from the same terminal, thereby allowing for an overall wider bandwidth and correspondingly higher per-link data rates.

According to LTE release 10, up to five component carriers, possibly of different bandwidths up to 20 MHz, can be aggregated allowing for overall transmission bandwidths up to 100 MHz A terminal capable of carrier aggregation may receive or transmit simultaneously on multiple component carriers.

A terminal capable of carrier aggregation has a downlink primary component carrier and an uplink primary component carrier. In addition, it may have one or several secondary component carriers in each direction. Different terminals may have different carriers as their primary component carrier, i.e. the primary component carrier configuration is terminal specific. The fact that carrier aggregation is terminal specific, i.e. that different terminals may be configured to use different set of component carriers, is useful from a network perspective to balance the load across component carriers.

It is possible to configure a terminal to aggregate a different number of component carriers originating from the same access node, eNodeB, and of possibly different bandwidths in the uplink and the downlink. The number of downlink component carriers that can be configured depends on the downlink aggregation capability of the terminal. The number of uplink component carriers that can be configured depends on the uplink aggregation capability of the terminal. Component carriers originating from the same eNodeB need not to provide the same coverage.

When carrier aggregation is used, there are a number of serving cells, one for each component carrier. The RRC connection is only handled by one cell, the primary cell, served by the primary component carrier. The other component carriers are all referred to as secondary component carriers, serving secondary cells. The secondary component carriers are added and removed as required, while the primary component carriers are only changed at handover.

Carrier aggregation enables a wireless device or user equipment, UE, to have one or more secondary cells. Carrier aggregation is performed at MAC layer. Since carrier aggregation is performed at MAC layer, the higher layers are not aware of which cell is being used for transmission; thus, the wireless device is only logically represented in the primary cell.

All idle mode procedures apply to the primary component carrier only, i.e. carrier aggregation with additional secondary carriers configured only applies to terminals in an RRC-CONNECTED state. Upon connection to the network, the terminal performs the related procedures such as cell search and random access following the same steps as in the absence of carrier aggregation. When going from IDLE to CONNECTED mode the wireless device performs attach to the cell which the wireless device is currently camping on. The cell to which the wireless device successfully attaches is the primary cell of this wireless device. When a communication between the network and the terminal has been established, additional secondary component carriers can be configured.

For load management each cell calculates the current CONNECTED load and compares this load with that of neighbor cells. If a neighbor cell has less load than this cell, a handover or release with redirect is performed to move one or several wireless devices to the lesser loaded cell (a load management triggered action).

Different load metrics can be considered. At the Packet Data Convergence Protocol, PDCP, layer, each wireless device is assigned one or more radio bearers, which in turn are separated in signaling radio bearers and data radio bearers. One natural way to introduce load contributions is to associate each radio bearer of the wireless device with a cost and sum over all radio bearers of the wireless device to come up with a total cost of the wireless device. Such a cost or load contribution is naturally associated with the primary cell, since PDCP performance is associated to the primary cell of the wireless device. At the physical layer on the other hand it is possible to associate the wireless device to a cost in terms of consumed radio resources, or radio resource utilization per carrier. This requires detailed monitoring of resource assignments per wireless device and carrier on lower layer.

Thus, in current solutions, the wireless device load contribution on higher layer is associated to a primary cell of the wireless device, while there is no wireless device load contribution associated to one or more secondary cells of the wireless device.

SUMMARY

It is an object of the present disclosure to provide a method in a network entity for load contribution distribution in a wireless communication system supporting component carrier communication. The disclosed method enables representation of load contribution associated to one or more secondary cells of the wireless device, thus reducing imbalance in the load contribution representation and reducing the risk of jeopardizing performance of load balancing mechanisms. The disclosed method enables an improved load contribution distribution that takes secondary cell usage information into account.

The present disclosure presents a method in a network entity for load contribution distribution in a wireless communication system supporting component carrier communication. The network entity serves a first cell of a wireless communication system. The method comprises receiving information on one or more secondary cell usages of the first cell, wherein a secondary cell usage represents a secondary component carrier load of a wireless device connected to a primary cell of one or more further cells which are different from the first cell. The information on primary cell usage and the one or more secondary cell usage for the first cell is compiled in the network entity. The method further comprises identifying the respective primary cell for each secondary cell usage. Finally it comprises sending secondary cell usage information to a respective network entity serving the identified respective primary cell for each secondary cell usage.

The proposed solution enables consideration of secondary cell load for the control of load distribution. If the secondary cell load is omitted, and only the primary cell load is considered, incorrect load balancing or sharing decisions may be taken. For example, if a specific cell is mainly loaded with secondary load, and fairly limited primary cell load, it may be considered as an attractive candidate for offloading to. Instead, if both primary and secondary load is considered, then the specific cell may be seen as unattractive and instead a cell with free resources with respect to both primary and secondary cell load is selected for offloading instead. Thus, consideration of the secondary cell load improves load balancing accuracy.

Similarly, when the main objective is to offload overloaded cells it is important to select an offloading target with free resources to avoid creating an overload situation in the target cell. With both primary and secondary cell load in consideration, the offload target cell can be more appropriately selected.

Furthermore, when only considering primary cell load, a specific cell may be considered only lightly loaded and therefore be a candidate for deactivation for energy savings purposes. The existing primary cell load will then be offloaded to other cells in order to abandon the cell and prepare for a deactivation. However, the specific cell may be carrying comprehensive secondary cell load, and when considering also secondary cell load, the specific cell does not stand out as a deactivation candidate and thereby a performance-wise incorrect decision of deactivation can be avoided.

According to one aspect, the method further comprises receiving secondary cell usage information from one or more network entities serving respective cells having secondary cell usage by wireless devices connected to the first cell as a primary cell. Total cell usage of the first cell is determined based on the received secondary cell usage information. Based on comparison of the total cell usage of the first cell and a total cell usage of the respective one or more further cells, the first cell is configured for secondary cell usage. This improves load contribution distribution substantially since the configuration of secondary cell usage will only be made if this has positive effects on load balancing in the radio access network. Moreover, as also indicated above, information about both primary and secondary cell load improves any kind of load management compared to considering only information about primary cell load.

According to one aspect, the information on one or more secondary cell usages is received from a network entity serving the first cell.

According to one aspect, the first cell is configured for further primary and/or secondary cell usage when the primary and secondary cell usage of the first cell is less than primary and secondary cell usage of the one or more further cells.

According to one aspect, the first cell is configured for reduced primary and/or secondary cell usage when the primary and secondary cell usage of the first cell is greater than primary and secondary cell usage of the one or more further cells.

According to one aspect the first cell is configured for further or reduced primary and/or secondary cell usage when the connected wireless device is capable of carrier aggregation.

According to one aspect, a total cell usage of each wireless device in a respective cell is determined from a respective radio bearer load contribution.

According to one aspect, the load contribution is a function of a quality of service, QoS, class indicator, CQI, which maps to a service type, service need or service requirement.

According to one aspect, the load contribution from secondary cell usage of a wireless device is assumed to be equal to a load contribution from a primary cell usage of the wireless device.

According to one aspect, the load contribution of secondary cell usage is scaled by the number of secondary component carriers assigned to the wireless device.

According to one aspect, a cell usage for each wireless device in a respective cell is determined from a target radio resource usage of wireless device and bearer, wherein the target radio resource usage is determined from a bit rate requirement for the bearer.

According to one aspect, the sending of secondary cell usage information to a respective network entity serving the identified respective primary cell for each secondary cell usage is initiated upon request for a load report from the identified respective primary cell.

According to one aspect, the sending of secondary cell usage information to a respective network entity serving the identified respective primary cell for each secondary cell usage is included in a periodic load report.

According to one aspect, a secondary cell usage is reported as a sum of secondary cell load for all secondary carrier components in the cell receiving the request for a report.

According to one aspect, a load report from a first cell comprises primary cell contribution for each wireless device having primary carrier component communication in the first cell. The load report further comprises secondary cell contribution received in secondary cell usage information. A secondary cell contribution for one or more further wireless devices having secondary carrier component communication to further cells and primary carrier component communication in the first cell is included in the load report.

According to an embodiment, the disclosure relates to a network entity for load contribution distribution in a wireless communication system supporting primary and secondary component carrier communication. The network entity serves a first cell of a wireless communication system and comprises a processor and a communication interface. The communication interface is configured to receive information on one or more secondary cell usages of the first cell, wherein a secondary cell usage represents a secondary component carrier load of a wireless device connected to a primary cell of one or more further cells which are different from the first cell. The communication interface is further configured to send secondary cell usage information to a respective network entity serving an identified respective primary cell for each secondary cell usage. The processor comprises a load compiling entity configured to compile information on primary cell usage of the first cell and the received secondary cell usage information for the first cell. The processor further comprises a primary cell identification entity configured to identify the respective primary cell for each secondary cell usage.

In accordance with a further aspect, the communication interface of the network entity is further configured to receive secondary cell usage information from one or more network entities serving respective cells having secondary cell usage by wireless devices connected to the first cell as a primary cell. Furthermore, the processor further comprises a cell usage determining entity configured to determine total cell usage of the first cell, the total cell usage including primary and secondary cell usage of the first cell. A load distribution entity is configured to configure the first cell for secondary cell usage based on comparison of the determined total cell usage of the first cell and respective total cell usages of the one or more further cells.

According to an aspect, the cell usage determining entity is further configured to determine cell usage from radio bearer load contribution.

According to another aspect, the communication interface is configured to receive a request for a load report. Sending of the secondary cell usage information to a respective network entity serving an identified respective primary cell for each secondary cell usage is initiated upon receiving the request.

According to an aspect of the disclosure, the network entity is configured to serve multiple cells of a radio access node and wherein the network entity serves the first cell and at least a subset of the one or more further cells.

According to a further embodiment, the disclosure also relates to a computer program, comprising computer readable code which, when run on a network entity causes the network entity to perform the disclosed method for load contribution distribution.

The disclosure provides for load contribution distribution for load balancing as well as for carrier aggregation. One result from implementing the load contribution distribution method is that a decision may be taken to offload a wireless device from a first to a further cell. However, the disclosed method is also applicable for making a selection of a secondary cell during carrier aggregation configuration. The disclosed embodiments are advantageous for load balancing, overload avoidance and energy saving in a wireless communication system.

With the above description in mind, the object of the present disclosure is to overcome at least some of the disadvantages of known technology as described above and below.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

DETAILED DESCRIPTION

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

Figure 1:
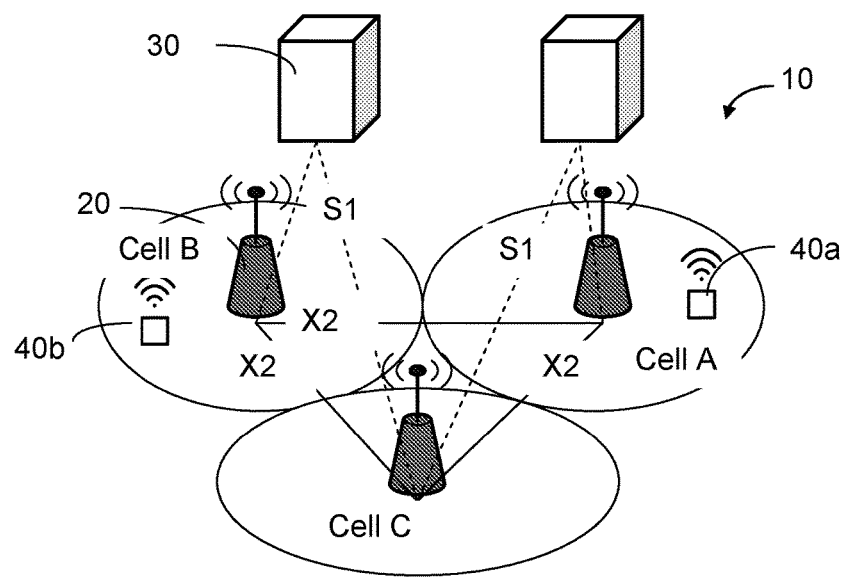
FIG. 1 illustrates LTE architecture with logical interfaces.

In a typical cellular radio system, wireless devices communicate via a radio access network, RAN, with one or more core networks. The wireless devices can be mobile stations or other types of user equipment, UE, such as portable, pocket, hand-held, computer-included, or car-mounted mobile devices which communicate voice and/or data with radio access network, e.g., mobile telephones and laptops with wireless capability. The RAN covers a geographical area which is divided into cell areas, with each cell area or group of cell areas being served by a radio access node. A cell is a geographical area where radio coverage is provided by equipment at the radio access node. Each cell is identified by an identity within the local radio area. The radio access nodes communicate over the air interface with the wireless devices within the cells served by the node. FIG. 1 discloses the architecture of a LTE system 10, including radio access nodes 20, also known as eNodeBs, evolved NodeBs or eNBs, and evolved packet core nodes 30, disclosed as MME/S-GW. Wireless device 40 connects to the radio access network, RAN, by means of one or more radio access nodes 20.

Figure 3:
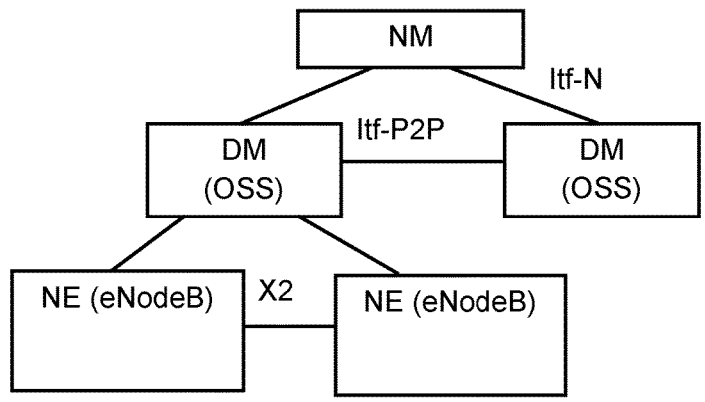
FIG. 3 illustrates a management system architecture, FIG. 4 exemplifies selection of SCell.

A management system for managing an LTE-system is disclosed in FIG. 3. The node elements, NE, are radio access nodes, e.g. an eNodeB 20 as illustrated in FIG. 1. The NE:s are managed by a domain manager, DM, also referred to as the operation and support system, OSS. A DM may further be managed by a network manager, NM. Two NEs are interfaced by the X2 interface, whereas the interface between two DMs is referred to as Itf-P2P. The management system may configure the network elements, as well as receive observations associated to features in the network elements. For example, DM observes and configures NEs, while NM observes and configures DM, as well as NE via DM.

A wireless device camps on one cell at a time, i.e. has one serving cell. When going from IDLE to CONNECTED mode, the wireless device performs attach to the cell which the wireless device is currently camping on. The cell to which the wireless device successfully attaches is the primary cell of the wireless device. FIG. 1 discloses a cell structure, wherein the wireless device 40a belongs to Cell A, and thus connects to cell A as primary cell.

Load management implies calculation in each cell of a current CONNECTED load and a comparison of the current connected load with that of neighboring cells. If a neighbor cell is found to have less load, a handover or release with redirect is performed to move one or several UEs to the lesser loaded cell (a load management triggered action). Load is evaluated from number of UEs or E-RAB usage. Another load calculation option is evaluation of Physical Resource Block, PRB, utilization. However, when considering PRB utilization, this must be recalculated to figure out if the load is due to a single user consuming a lot of the resources or if there are multiple users that compete of the resources before comparing the load to other cells.

Figure 2:
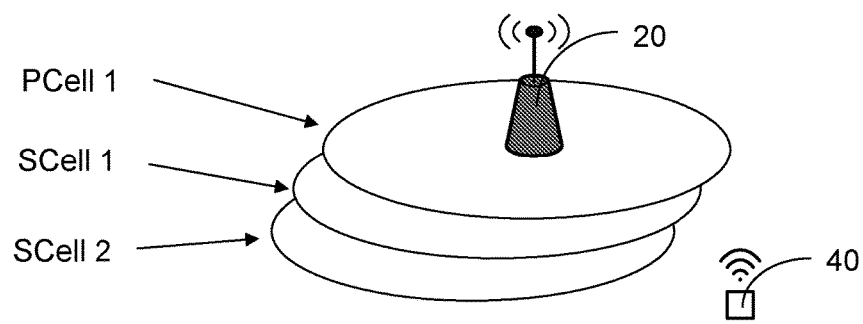
FIG. 2 illustrates a radio base station with several component carriers of a UE.

Carrier aggregation enables the UE to have one or more secondary cells, such a cell structure is illustrated in FIG. 2, wherein the radio access node has several cells configured as different component carriers for the UE. One component carrier is the primary cell, PCell and the other illustrated component carriers are secondary cells, SCells. Carrier aggregation is performed at MAC layer. Since carrier aggregation is performed at MAC layer, the higher layers are not aware of which cell is being used for transmission. This means that the UE 40 is only logically represented in the primary cell. Legacy load calculation only considers UE that are in primary cell. This means that any traffic introduced by secondary cell usage is not considered when comparing the cells with each other.

In order to share information about load contribution to better reflect the current load situation, the different cells need to share and signal load contributions between each other. This information is used when assigning/activating/configuring component carriers to different users.

The cells are served by the same hardware entity in the same base station or main unit, different hardware entity in the same base station or main unit, or different base stations or main units. Each base station or main unit serves the UE with all its bearers or a subset. In case some bearers are associated to one cell and some other bearers are associated to another cell, then the signaled load contribution is separated per serving cell and bearer.

Figure 6:
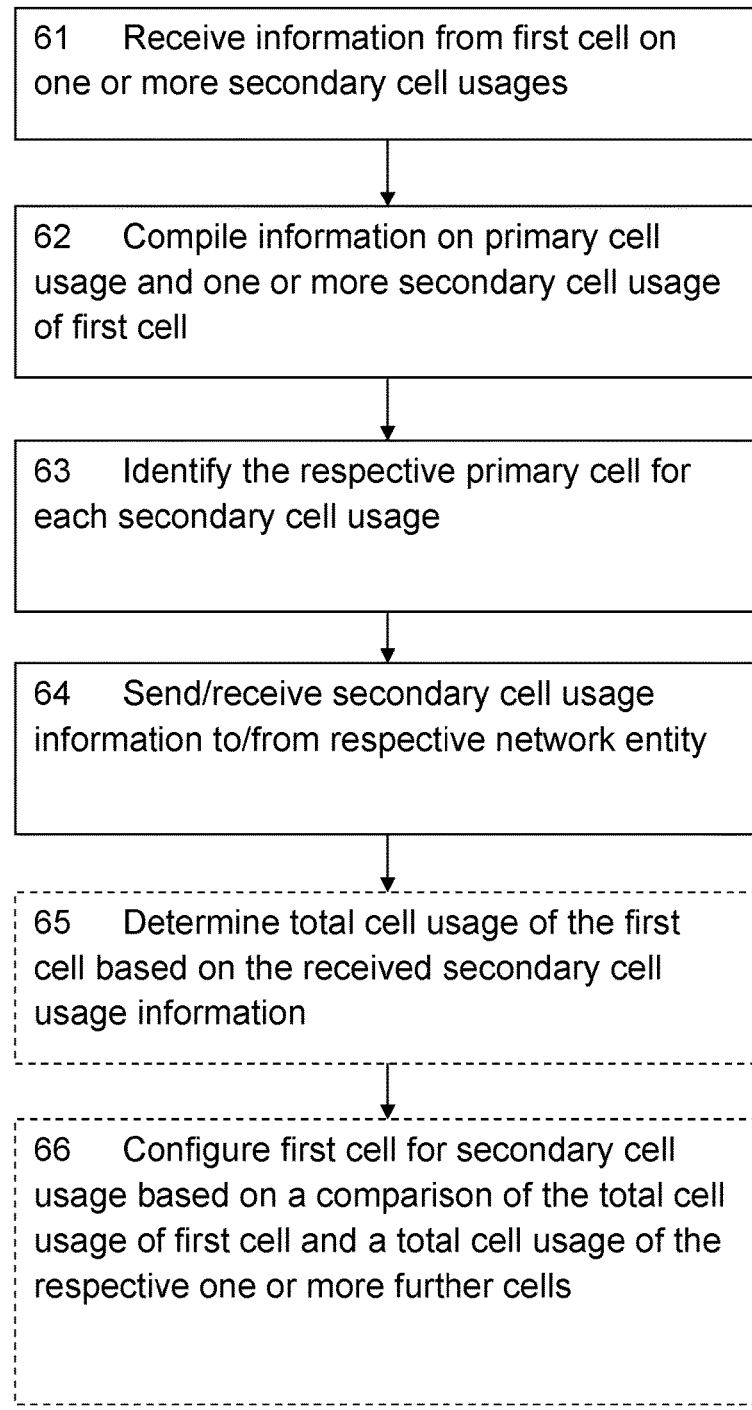
FIG. 6 is a schematic flowchart illustrating embodiments of method steps according to the disclosure.

FIG. 6 discloses a method of in a network entity, e.g. a radio access node such as an eNodeB, or a management system, e.g. an operation and support system, OSS, serving cells of a wireless communication system supporting component carrier communication. The network entity serves a first cell of the wireless communication system, thereby not excluding the possibility that the network node also serves one or more of the other cells of the wireless communication system. When a wireless device successfully attaches to a network, the cell to which the wireless device attaches is the primary cell. However, when multiple carriers are available, the wireless device may simultaneously receive or transmit on multiple carrier components depending on its capabilities. The further cells configured to transmit/receive on additional carrier components are secondary cells for the wireless device.

In a first step 61 of the disclosed method, the network node receives information on one or more secondary cell usages of the first cell. A secondary cell usage implies secondary component carrier load of a wireless device connected to a primary cell of one or more further cells that are different from the first cell, i.e., if there are wireless devices connected to other cells that also use the first cell as a component carrier, information on the secondary usage of the first cell is sent to the network entity from network entities of such further cells.

An adequate load contribution definition of individual wireless device is typically dependent on available information. In accordance with one embodiment, each radio bearer j of UE i is associated to a load contribution Lij. This can be a function of the QoS class indicator (QCI), which maps to the service type, service needs, service requirements etc, providing a load contribution Lij(CQI_j).

The load contribution associated to UE i can be determined as the sum over all bearers j of the UE, when served by PCell k.

$Li\_PCell\_k=Sum\_j[Lij(CQI\_j)]$

Since the PCell is the main control point of the UE, it means that one approach is to associate the UE load contribution only with the PCell and zero contribution with the possible SCells. However, such an approach does not provide the benefits of an improved load contribution distribution.

In one embodiment, the same load contribution is associated with SCell as well as PCell, meaning that each bearer will contribute with Lij(CQI_j) also to the SCell n.

$Li\_SCell\_n=Sum\_j[Lij(CQI\_j)]$

In an alternative embodiment, the SCell load contribution is scaled by the number of component carriers Ni that are assigned to UE i. This means that the load contribution is divided by Ni.

$Li\_SCell\_n=1/Ni*Sum\_j[Lij(CQI\_j)]$

In this embodiment, the PCell load contribution can still be without scaling as in the previous embodiment, or scaled to be the same as the SCell load contribution.

More generally, the load contribution to component carrier c is weighted by w_c, which means that component carrier c is associated to the load contribution $Li\_SCell\_n=w\_n*Sum\_j[Lij(CQI\_j)]$ If bearers are jointly handled across all component carriers, then the weights can be independent of the bearers. However, if some bearers are associated to some component carriers only, then the weights can also be component carrier and bearer specific:

$Li\_SCell\_n=w\_nj*Sum\_j[Lij(CQI\_j)]$

The bearer specific weights are of particular interest when bearers are handled differently dependent of the role of the cell. One such role is SCell, but the role can be assisting eNB as discussed as part of dual connectivity, where nodes have bearer-specific serving cell relations.

The QCI concept is general, even though the example is LTE specific, and therefore it can be applied to other radio access technologies as well.

In step 62 the receiving network entity compiles the information on primary cell usage and the one or more secondary cell usage for the first cell, i.e. collects the information, as a preparatory step of sharing information on the load contribution with network entities serving the further cells. The cells can be served by the same hardware entity in the same network entity, e.g. eNodeB, different hardware entities in the same network entity or different network entities.

In a further step 63, the network entity identifies the respective primary cell for each secondary cell usage. Each radio access node may be serving the wireless device with all its bearers or a subset. In case some bearers are associated to a primary cell usage and some other bearers are associated to a secondary cell usage, then the primary cell associated with each secondary cell usage is identified so that the cell usage information will be available for primary cell usage as well as secondary cell usage for each cell.

In an information exchange step 64, the serving network entity sends information on the secondary cell usage to respective network entities that have been identified to serve respective primary cells for each secondary cell usage. The sending of information on the secondary cell usage implies providing information to receiving network entities; thus enabling the receiving network entities improve load contribution distribution between the cells, e.g. for load balancing, overload avoidance or energy saving.

As illustrated in step 64, the network entity serving a first cell of a wireless communication system can also receive information from the further cells of the network relating to secondary cell usage of the first cell. Upon receipt of the secondary cell usage information, a total current load of the first cell is determined from a total cell usage determined in step 65. The total cell usage including primary and secondary cell usage of the first cell and the secondary cell usage received from respective network entities, e.g. one or more eNodeBs. Correspondingly, the total current load of the further cells is determined from the total cell usage, i.e. the sum of the primary cell usage and the secondary cell usage, of the respective further cells. Following a comparison total cell usage of the first cell and total cell usage of the one or more further cells, the first cell is configured, in step 66, for secondary cell usage when the comparison implies a favorable load contribution distribution when using the first cell for secondary cell usage. In this instance, the configuring of the first cell for secondary cell usage could also imply configuring the first cell for further secondary cell usage, since the first cell may already be used as a secondary cell.

Figure 4:
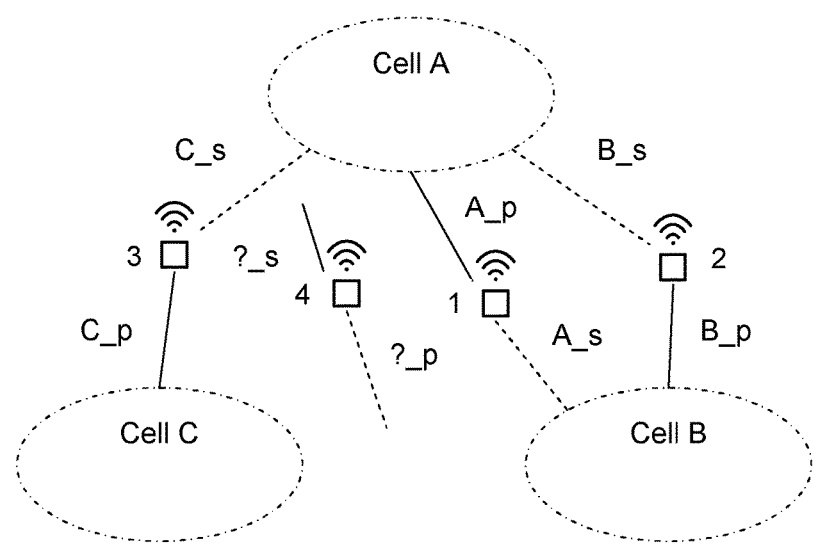

FIG. 4 discloses an example of the reporting of the cell usage between three cells A, B and C in a wireless communication network with wireless devices 1-4 within the area of the cells. The wireless devices illustrated as having a primary or secondary connection to a cell, are of course considered to belong to the respective cell. Consequently, the illustrated borders of the cells, are only provided to illustrate a cell concept and do not visualize the extent of the cell.

Figure 5:
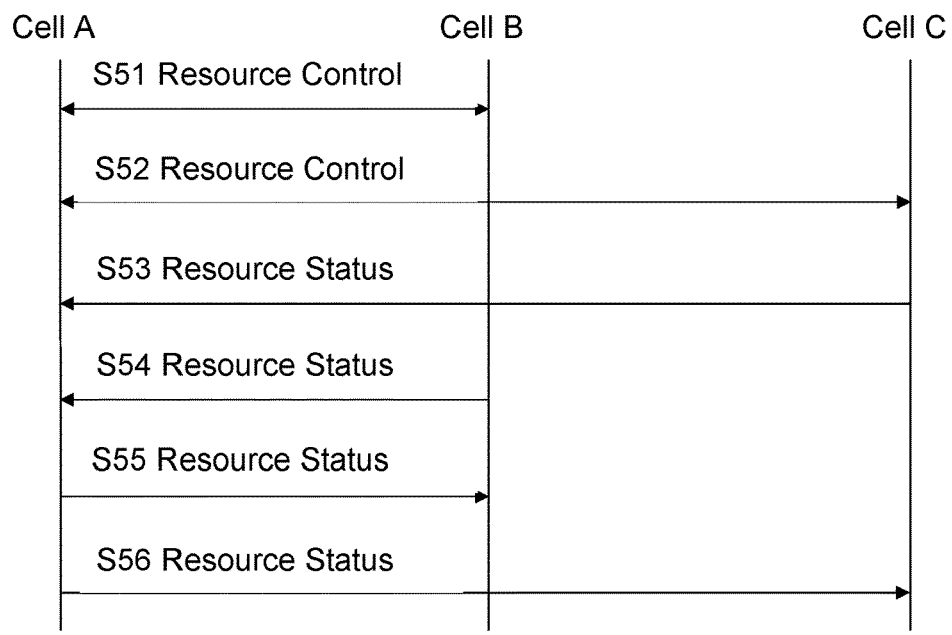
FIG. 5 is a signaling diagram illustrating an exchange of load information between the cells of FIG. 4.

The three cells A-C exchange load information with each other as illustrated in FIG. 5. Such load contribution information is included in the S53-S56 Resource Status signaling. The Resource Status Report S53 from Cell C to Cell A would typically include PCell load in Cell C, a sum of SCell load, and SCell load towards Cell A. The corresponding Resource Status Report S54 from Cell B to Cell A, would typically include PCell load in Cell B, a sum of SCell load in Cell B and SCell load towards Cell A. The Resource Status Report S55 from Cell A to Cell B comprises PCell load in Cell A, a sum of SCell load in Cell A, and the SCell load towards Cell B. The Resource Status Report S56 from Cell A to Cell C comprises PCell load in Cell A, a sum of SCell load in Cell A, and the SCell load towards Cell C. The PCell load corresponds to the current load information based on primary cell usage in the reporting cell.

In the example embodiment, the sum of SCell load received from the other cells is included together with SCell load from this cell to a specific cell. The sum of SCell load is the sum of the received SCell load from other cells, since the primary cell cannot calculate this on its own since these UEs are not represented in the primary cell. This is also the reason why SCell load from this cell to the cell requesting the report is included (used by the requesting cell to calculate its own sum of SCell load from other cells).

In each report sent out, the potential SCell load towards the cell that receives the load report is included as described above. In the disclosed example of three cells with UE 1-4, wherein UE 1 has a primary cell in cell A and a secondary cell in cell B, UE 2 has a secondary cell in Cell A, and UE3 has a secondary cell in Cell A, Cell A will need to report the following:

$$A\_p = w\_Aj * \text{Sum}\_j[L1j(CQI\_j)]$$

$$B\_s + C\_s = w\_Bj * \text{Sum}\_j[L2j(CQI\_j)] + w\_Cj * \text{Sum}\_j[L3j(CQI\_j)]$$

$$A\_s = w\_Aj * \text{Sum}\_j[L1j(CQI\_j)]$$

Consequently, Cell A reports three parameters in the periodic load report

A_p (legacy PCell contribution due to UE 1)

Sum of C_s+B_s, to cell C and B (received from B and C) due to UE 2 and 3

A_s to cell B only due to UE 1.

When a wireless device attaches to a first cell and is carrier aggregation capable, a secondary cell could be selected. If multiple choices exist for a selection, the determined cell usages for the cells are used as an input to make a decision on secondary cell selection.

In the exemplified scenario with three cells A-C and connected wireless device 1-3, the primary cell is indicated as a connection from respective wireless device to the cell. Wireless device 1 is connected to Cell A as a primary cell through connection A_p, wireless device 2 is connected to Cell B as a primary cell through connection B_p, and wireless device 3 is connected o cell C as a primary cell through connection C_p. In the illustrated scenario each wireless device 1-3 also has a secondary cell.

To illustrate a scenario where the load contribution distribution is affected based on the exchange of previously described reports, a fourth UE that is not yet connected to any of the cells is assumed to be present in the area of the three cells. The selection of primary could be any of the cells (depending on which cell the UE is camping on). Once the UE is connected to one of the cells, the secondary cell will be configured. If secondary cell was selected only depending on PCell load (filled lines), all UEs could select the same SCell. Instead the sum of PCell load+SCell load is compared between the cells. In the example above the following load conditions exists:

Cell A: PCell load=A_p, SCell load=C_s+B_s.

Cell B: PCell load=B_p, SCell load=A_s

Cell C: PCell load=C_p, SCell load=none

In the simplified example above this means that if each UE would generate the same load this would mean that if the UE was connected to Cell A as a primary cell, then Cell C would be selected as SCell. If the UE was connected to Cell B, then Cell C would be selected as SCell. If the UE was connected to cell C, then Cell B would be selected as SCell. This optimizes cell efficiency and gives each carrier aggregation user the best possible starting point to get high throughput.

FIG. 5 discloses the signaling of said reports between Cell A-C when having wireless device 1-3 connected to Cell A-C as described with relation to FIG. 4. The cells A-C exchange load information with each other. Cell A transmits cell resource control requests S51, S52 to cells B and C. Cell B and C responds by transmitting cell resource status reports S53 and S54 indicting primary cell load, PCell load, as well as the sum of secondary cell load, SCell load, received from the other cells and SCell load from the other cell to a requesting cell. The SCell load from the responding cell to the cell requesting the report is also included (used by the requesting cell to calculate its own sum of SCell load from other cells). Similarly, the requesting cell A responds by transmitting cell resource status reports S55 and S56 to cells B and C; the cell resource status report S55 including the primary cell load of Cell A, the sum of the secondary cell load received from cell B and C, and the secondary cell load from cell A.

In each report sent out, the potential SCell load towards the cell that receives the load report is included as described above. In the example below, cell A will need to report the following:

$$A\_p = w\_Aj * Sum\_j[L1j(CQI\_j)]$$

$$B\_s + C\_s = w\_Bj * Sum\_j[L2j(CQI\_j)] + w\_Cj * Sum\_j[L3j(CQI\_j)]$$

$$A\_s = w\_Aj * Sum\_j[L1j(CQI\_j)]$$

Figure 7:
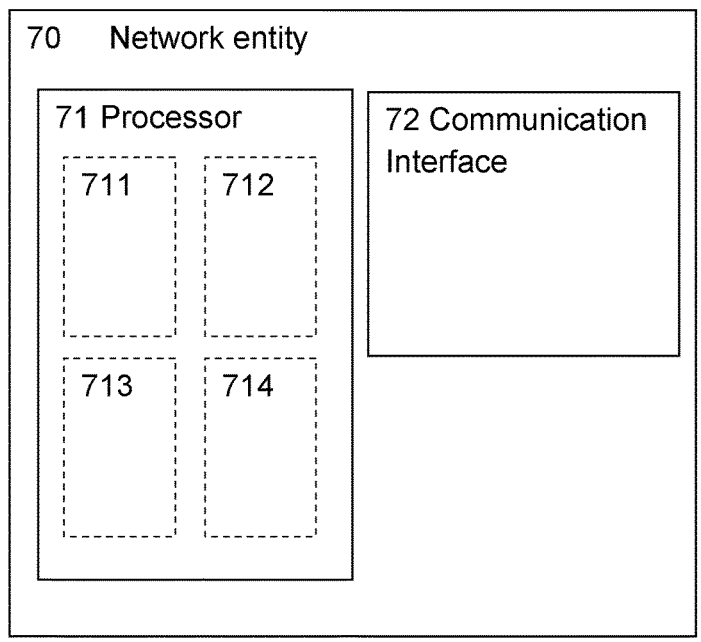
FIG. 7 is a block diagram illustrating embodiments of a network.

FIG. 7 illustrates a network entity 70 configured for load contribution distribution. The network entity 70 is part of a wireless communication system supporting primary and secondary component carrier communication. The network entity 70 serves a first cell of a wireless communication system, but could also be serving a plurality of cells of the wireless communication system, e.g. an eNodeB serving a plurality of cells or sectors of the wireless communication network. The network entity 70 could belong to a management system of a wireless communication network, such as the operation and support system, OSS, illustrated in FIG. 2 and controlling the operation of a plurality of eNodeBs.

The network entity 70 disclosed in FIG. 7, includes a processor 71 and a communication interface 72. A processor executes instructions from computer readable code, stored in the processor, a separate memory or any other known format accessible for execution in a processor. The communication interface 72 is configured to receive information from the first cell on one or more secondary cell usages of the first cell, wherein each secondary cell usage corresponds to a secondary component carrier communication by a wireless device connected to a primary cell primary cell which is different from the first cell. The communication interface is also configured to send secondary cell usage information to a respective network entity serving an identified respective primary cell for each secondary cell usage and correspondingly, to receive secondary cell usage information from other network entities sending secondary cell usage information to the network entity.

A load compiling entity 711 in the processor compiles the information on primary cell usage and the received secondary cell usage for the first cell. A primary cell identification entity 712 is configured to identify the respective primary cell for each secondary cell usage. A cell usage determining entity 713 is configured to determine the total cell usage of the first cell, the total cell usage including primary and secondary cell usage of the first cell. A load distribution entity 722 in the processor is arranged to configure the first cell for secondary cell usage based on comparison of the determined total cell usage of the first cell and a determined total cell usage of the one or more further cells.

In an embodiment the network entities are logical, meaning that they are located in the same processor and the interactions and information sharing is internal in the processor between the entities.

In another embodiment, the network entities are divided over two or more processing units, and the interactions and information sharing is over an interface between the processing units. The processing units may have dedicated memory, common memory or a combination of both.

In another embodiment, the network entities are divided over two or more physical nodes, and interactions are handled via dedicated communication circuitries.

Reference throughout this specification to "one aspect," "an aspect", "one embodiment" or "an embodiment" means that a particular feature, structure, or characteristic described in connection with the embodiment is included in at least one embodiment of the present disclosure. However, the references are not necessarily all referring to the same embodiment. Furthermore, the described features, structures, or characteristics may be combined in any suitable manner in one or more embodiments.

While the forgoing examples are illustrative of the principles of the present disclosure in one or more particular applications, it will be apparent to those of ordinary skill in the art that numerous modifications in form, usage and details of implementation can be made without the exercise of inventive faculty, and without departing from the principles and concepts of the disclosure.

The invention claimed is:

1. A method in a network entity for load contribution distribution in a wireless communication system supporting component carrier communication, wherein the network entity serves a first cell of a wireless communication system, the method comprising:
   i. receiving information on one or more secondary cell usages of the first cell, wherein a secondary cell usage represents a secondary component carrier load of a wireless device connected to a primary cell of one or more further cells which are different from the first cell;
   ii. compiling information on primary cell usage and the one or more secondary cell usage for the first cell;
   iii. identifying the respective primary cell for each secondary cell usage; and
   iv. sending secondary cell usage information to a respective network entity serving the identified respective primary cell for each secondary cell usage.

2. A method according to claim 1, further comprising:
   i. receiving secondary cell usage information from one or more network entities serving respective cells having secondary cell usage by wireless devices connected to the first cell as a primary cell;
   ii. determining a total cell usage of the first cell based on the received secondary cell usage information, the total cell usage including primary and secondary cell usage of the first cell; and iii. configuring the first cell for secondary cell usage based on a comparison of the total cell usage of the first cell and a total cell usage of the respective one or more further cells.

3. The method according to claim 1, wherein the information on one or more secondary cell usages is received from a network entity serving the first cell.

4. The method according to claim 2, wherein the first cell is configured for further primary and/or secondary cell usage when the primary and secondary cell usage of the first cell is less than primary and secondary cell usage of the one or more further cells.

5. The method according to claim 2, wherein the first cell is configured for reduced primary and/or secondary cell usage when the primary and secondary cell usage of the first cell is greater than primary and secondary cell usage of the one or more further cells.

6. The method according to claim 4, wherein the first cell is configured for further or reduced primary and/or secondary cell usage when the connected wireless device is capable of carrier aggregation.

7. The method according to claim 1, wherein a total cell usage of each wireless device in a respective cell is determined from radio bearer load contribution.

8. The method according to claim 7, wherein the load contribution is a function of a quality of service, QoS, class indicator, CQI, which maps to a service type, service need or service requirement.

9. The method according to claim 7, wherein the load contribution from a secondary cell usage of a wireless device is assumed to be equal to a load contribution from a primary cell usage of the wireless device.

10. The method according to claim 7, wherein the load contribution of secondary cell usage is scaled by the number of secondary component carriers assigned to the wireless device.

11. The method according to claim 1, wherein a total cell usage for each wireless device in a respective cell is determined from a target radio resource usage of the respective wireless device and bearer, wherein the target radio resource usage is determined from a bit rate requirement for the bearer.

12. The method according to claim 1, wherein the sending of secondary cell usage information to a respective network entity serving the identified respective primary cell for each secondary cell usage is initiated upon request for a load report from the identified respective primary cell.

13. The method according to claim 1, wherein the sending of secondary cell usage information to a respective network entity serving the identified respective primary cell for each secondary cell usage is included in a periodic load report.

14. The method of any of claim 12, wherein a secondary cell usage is reported as a sum of secondary cell load for all secondary carrier components in the cell.

15. The method of claim 12, wherein a load report from a first cell comprises:
  i. primary cell contribution for each wireless device having a primary carrier component communication in the first cell;
  ii. secondary cell contribution received in secondary cell usage information; and
  iii. secondary cell contribution for one or more further wireless devices having secondary carrier component communication to further cells and primary carrier component communication in the first cell.

16. A network entity for load contribution distribution in a wireless communication system supporting primary and secondary component carrier communication, wherein the network entity serves a first cell of a wireless communication system, the network entity comprising a processor, and a communication interface:
  i. the communication interface configured to
  receive information on one or more secondary cell usages of the first cell, wherein a secondary cell usage represents a secondary component carrier load of a wireless device connected to a primary cell of one or more further cells which are different from the first cell, and
  send secondary cell usage information to a respective network entity serving an identified respective primary cell for each secondary cell usage; and
  ii. the processor configured to:
  compile information on primary cell usage of the first cell and the received secondary cell usage information for the first cell; and
  identify the respective primary cell for each secondary cell usage.

17. The network entity according to claim 16, wherein
  i. the communication interface is further configured to
  receive secondary cell usage information from one or more network entities serving respective cells having secondary cell usage by wireless devices connected to the first cell as a primary cell; and
  ii. the processor is further configured to:
  determine total cell usage of the first cell, the total cell usage including primary and secondary cell usage of the first cell; and
  configure the first cell for secondary cell usage based on comparison of the determined total cell usage of the first cell and respective total cell usages of the one or more further cells.

18. The network entity according to claim 16, wherein the processor is configured to determine cell usage from load contribution of a radio bearer.

19. The network entity according to claim 16, wherein the communication interface is configured to receive a request for a load report and wherein sending of the secondary cell usage information to a respective network entity serving an identified respective primary cell for each secondary cell usage is initiated upon receiving the request.

20. The network entity according to claim 16 wherein the network entity is configured to serve multiple cells of a radio access node and wherein the network entity serves the first cell and at least a subset of the one or more further cells.

21. A computer program, comprising computer readable code which, when run on an network entity causes the network entity to perform the method as claimed in claim 1.

* * * * *